United States Patent

[11] 3,628,392

| [72] | Inventors | Ilya Ilich Ivashkov<br>9 Parkovaya ulitsa 43/26, kv. 198;<br>Vasily Alexandrovich Frolovtsev,<br>Ferganskaya ulitsa, 18, kv. 263, both of<br>Moscow, U.S.S.R. |
|---|---|---|
| [21] | Appl. No. | 276 |
| [22] | Filed | Jan. 2, 1970 |
| [45] | Patented | Dec. 21, 1971 |

[54] MULTIROW FLAT-LINK CHAIN
5 Claims, 3 Drawing Figs.

[52] U.S. Cl. .................................................. 74/245 R,
74/250 R, 74/251 R
[51] Int. Cl. .................................................. F16g 13/02
[50] Field of Search .................................................. 74/245 R,
245 LP, 250 R, 251 R

[56] References Cited
UNITED STATES PATENTS

| 2,231,213 | 2/1941 | Mize.............................. | 74/251 |
| 3,043,154 | 7/1962 | Karig et al. .................. | 74/250 X |

*Primary Examiner*—Leonard H. Gerin
*Attorney*—Waters, Roditi, Schwartz and Nissen ABSTRACT: A multirow flat-link chain, whose hinges are formed by supporting members contacting each other by their external working surfaces of which one is convex and the other concave. The chain is simple in manufacture, strong, durable and is reliable when used in corrosive, chemically active and pulverized media.

MULTIROW FLAT-LINK CHAIN

The present invention relates to the construction of multirow flat-link chains.

Known in the prior art are multirow flat-link chains, whose hinges are formed by interacting rolls and hubs (cf. Catalogues of Tsubaki Company), the roll of each hinge being passed loosely through holes made in the hubs. The hubs are fixedly secured in plates, and the rolls, in turn, are fixedly secured in external plates, and are passed either loosely, or with some tension through holes in intermediate plates designed to ensure equal strength of adjacent links. Fitted on the hubs are rolls which are used to decrease wear of the hub, resulting from its friction with the sprocket teeth. The gaps between the hubs and the rolls are minimized to decrease the contact stress.

However, the conventional chains possess a number of substantial disadvantages. The walls of the hubs and rolls, which are rather thin, are sensitive to shock loads and overloads, and are quickly destroyed under high speeds and great loads, All this makes the chains less durable, does not allow high rates of chain operation and requires a greater safety factor. When manufacturing plates, the hubs and the rollers may be different in size and, as a result, not all the teeth of the sprocket contact the chain rollers. in the course of the engagement of the chain with the sprocket, therefore, no uniform distribution of loading along the chain rows is provided. Since the hinges of such chains are formed by a great number of parts, it is extremely difficult, when assembling the chain, to attain the high precision necessary to provide for the normal chain operation in transmissions. Small gaps between the hubs and the rolls hamper the assembly of chains and render the latter unsuitable for operation in corrosive, chemically active and pulverized media. Such chains are expensive to produce and labor-consuming in production.

It is an object of the present invention to provide a multirow flat-link chain that will be more reliable and durable, have a smaller weight and be less labor-consuming in manufacture then the known chain.

This object is accomplished in a multirow flat-link chain, in which the hinge joints are formed by supporting members interacting with each other by their external working surfaces, one of which surfaces is convex and the other concave, each of the supporting members having a convex working surface interacting with some supporting members having a concave working surface, the number of the latter corresponding to that of the rows of the flat-link chain.

It is expedient to make the maximum size of the cross section of a supporting member, having a concave working surface in the zone of contact of the supporting members contact, exceed the maximum size of the cross section of a supporting member having a convex working surface.

The supporting members having concave working surfaces may be made of polymeric materials.

It is desirable that the distances between adjacent supporting members having concave working surfaces be greater than the distances between adjacent supporting members having convex working surfaces.

The following description of exemplary embodiments of the present invention is given with reference to the accompanying drawings, in which.

Figure 3:
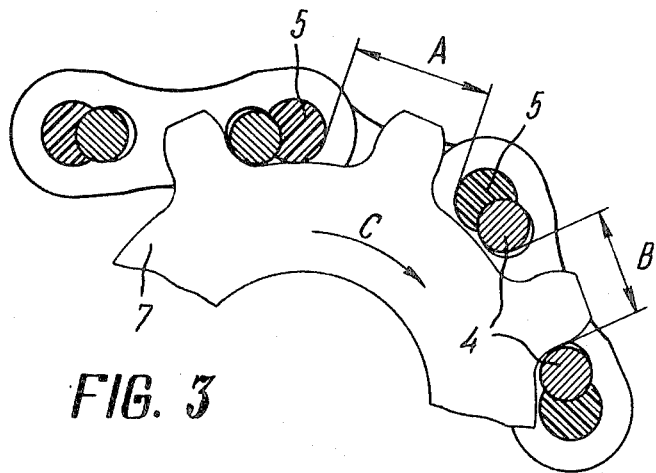

FIG. 3 diagrammatically shows the engagement of the proposed multirow flat-link chain with a sprocket.

Figure 1:
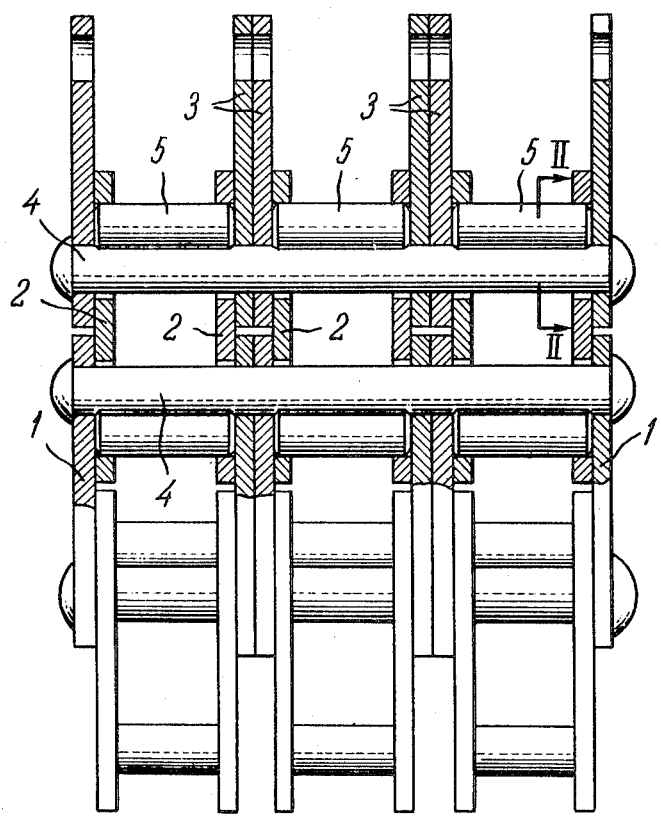
FIG. 1 is a front elevation view partly in section of the proposed multirow flat-link chain.
Figure 2:
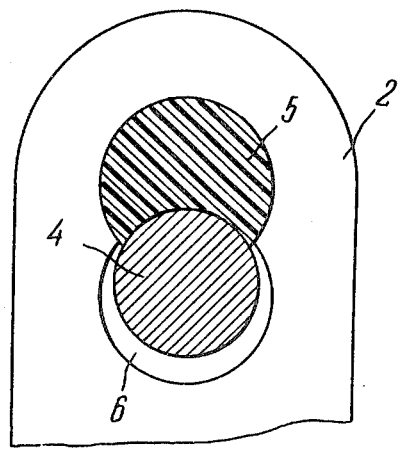
FIG. 2 is a section taken along line II—II of FIG. 1.

The chain comprises external plates 1 (FIG. 1), internal plates 2, intermediate plates 3, supporting members 4 (FIGS. 1, 2) with convex working surfaces and supporting members 5 with concave working surfaces (referred to as the working surface is the portion of the supporting member surface that contacts another supporting member). The supporting members 4 are stationary fixedly secured in the external plates 1 (FIG. 1), and are passed either loosely or with some tension through holes made in the intermediate plates 3. The supporting members 5 are stationary fixedly secured in the internal plates 2 which have holes 6 (FIG. 2) for the supporting members 4 to be loosely passed therethrough.

The maximum size of the cross section of the supporting member 5 with the concave working surface (which is its diameter in this case) is chosen to be greater than the maximum size of the cross section of the supporting member 4 with a convex working surface, which makes stronger the connection of the supporting member 5 with the chain plates.

The supporting member 5 may be made from a polymeric, material which helps considerably decrease the weight of the chain, reduce the noise the chain produces in the course of its operation, and attributes to better chain operation in corrosive and chemically active media.

During the chain operation the supporting members 4 and 5 turn freely relative to each other remaining at the same time stationary relative to the plates in which they are secured.

In case the proposed multirow flat-link chain is made so that the distance A (FIG. 3) between adjacent supporting members 5 having concave working surfaces it greater than the distance B between adjacent supporting members 4 having convex working surfaces, during the chain drive operation the teeth of the sprocket 7 will contact only the supporting members 4 (arrow C designates the direction of the sprocket 7 rotation). As all the teeth of one transverse row of the sprocket 7 contact one and the same supporting member 4, all the rows of the chain are loaded uniformly, and, therefore, the chain working capacity increases.

A chain having the contact pitch (pitch along the line of engagement) of the proposed chain comprises a considerably smaller number of members than conventional hub and roll multirow chains, which provides for a high precision of assembly of the proposed chain.

Unlike in the conventional chains, in the proposed chain the diameter of the holes made in the internal plates 2 for the passage of the supporting member 4 therethrough, does not affect the contact stress in the hinge joint, and these holes may be made so as not to hamper the chain assembly, i.e., to provide for a sufficiently large gap between the supporting member 4 and the hole made in the internal plate 2, which is particularly important when assembling chains having a great number of rows. The possibility to increase said gaps, as well as the fact that the supporting members contact each other over a relatively small surface and that in the course of the chain operation the supporting members slide along each other and scrape off any adhering material of the medium in which the chain operates adhering thereto (thus providing for self-cleaning of the chain hinge joints), make the proposed chain, as compared to the conventional ones, more reliable. The hinge joints of the proposed chain remain movable even in corrosive, chemically active and pulverized media.

Additionally, unlike the conventional chain, in which the walls of the hubs and rolls are thin, the supporting members of the proposed chain are rather thick, which considerably increases the strength of the chain and makes it less sensitive to shock loads and overloading, and, therefore, makes it possible to use the chain under higher speeds and greater loads.

Due to the provision of a required precision and simplification of assembly, a smaller number and simpler design of the parts forming the chain hinge joints, the proposed chain, other things being equal, is more economical in manufacture and has a smaller weight.

What is claimed is:

1. A multirow flat-link chain comprising: plates; hinge joints of said plates; supporting members forming said hinge joints, said supporting members interacting with each other at external working surfaces thereof which one is convex and the other concave, and each of said supporting members with convex working surfaces interacting with several supporting members having concave working surfaces, the number of the latter corresponding to the number of rows of the chain.

2. A multirow flat-link chain as claimed in claim 1, in which the maximum size of the cross section of said supporting member having a concave working surface is greater in the zone of contact of said supporting members than the maximum size of the cross section of said supporting member with the convex working surface.

3. A multirow flat-link chain as claimed in claim 1, in which said supporting members with concave working surfaces are made from polymeric materials.

4. A multirow flat-link chain as claimed in claim 1, in which the distances between adjacent supporting members with concave working surfaces are greater than the distances between adjacent supporting members with convex working surfaces.

5. A multirow flat-link chain as claimed in claim 3, in which the distances between adjacent supporting members with concave working surfaces are greater than the distances between adjacent working members with convex working surfaces.

* * * * *